UNITED STATES PATENT OFFICE.

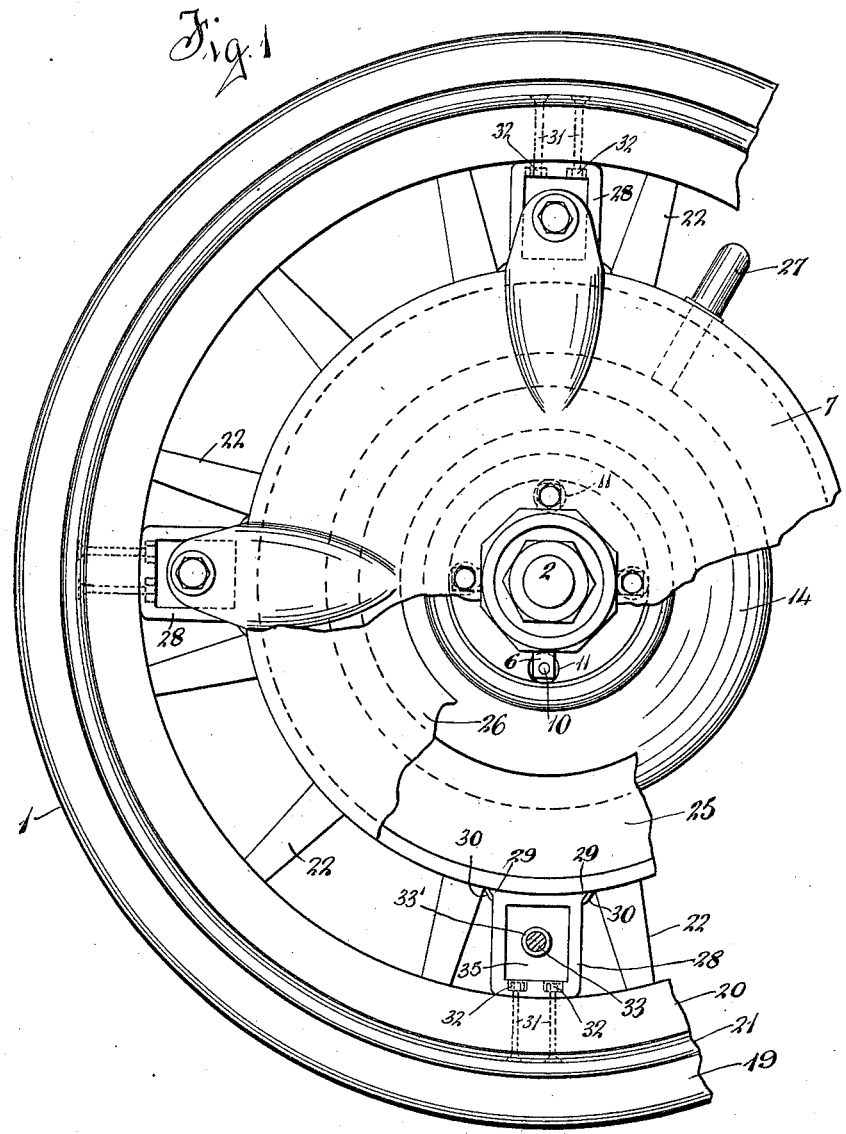

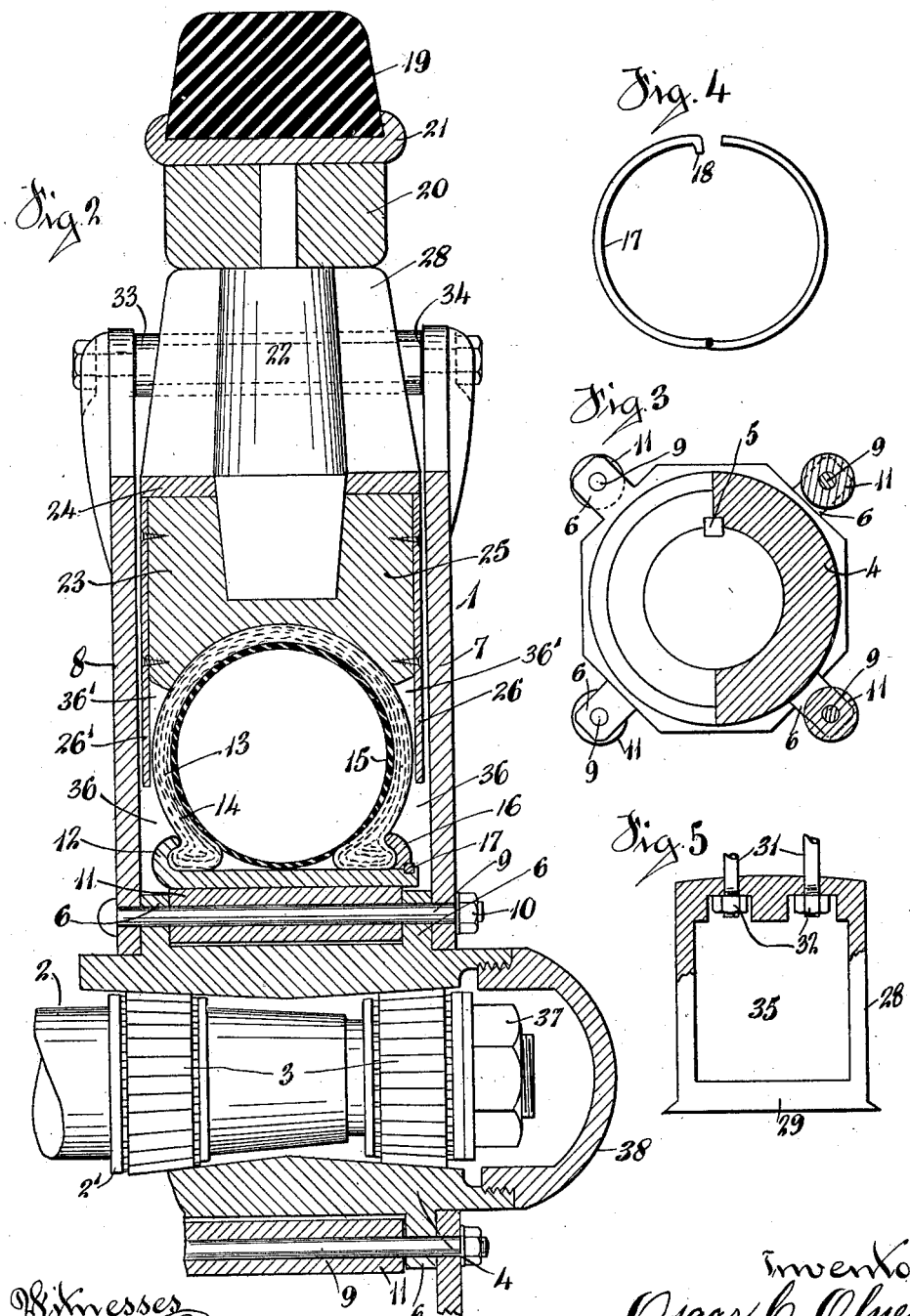

OSCAR C. OLNEY, OF CINCINNATI, OHIO, ASSIGNOR OF ONE-FOURTH TO HENRY OSTHOLTHOFF AND ONE-FOURTH TO EARL W. HERZOG, OF CINCINNATI, OHIO, AND ONE-FOURTH TO JOSEPH BRAUKMANN, OF COVINGTON, KENTUCKY.

PNEUMATIC AUTOMOBILE-WHEEL.

1,029,625. Specification of Letters Patent. Patented June 18, 1912.

Application filed December 26, 1911. Serial No. 667,717.

*To all whom it may concern:*

Be it known that I, OSCAR C. OLNEY, a citizen of the United States, residing at Cincinnati, in the county of Hamilton and State of Ohio, have invented certain new and useful Improvements in Pneumatic Automobile-Wheels, of which the following is a specification.

My invention relates to improvements in pneumatic automobile wheels having an inner pneumatic cushion.

The object of my invention is to overcome and eliminate any damage to the pneumatic cushion due to the wheel striking an irregular, uneven or broken surface, to increase the durability of the wheel, to reduce the cost of maintenance, to minimize the damage to all parts of the car due to the distribution of the shock through the entire wheel which overcomes any sudden jolt or jar, to provide an inner pneumatic cushion which is convenient to apply or remove and which is not liable to become injured or damaged by friction with the adjacent parts of the wheel, whereby a more direct transmission of power from one part to the other is conveyed, and whereby a greater leverage is obtained, thus overcoming side or twisting strains or stresses, and to overcome sudden jars in stopping or starting the car.

My invention consists in providing a wheel with a hub having a plurality of movable bearings upon its periphery, a clencher ring surrounding said bearings and adapted to move relatively thereto, a pneumatic cushion detachably mounted on said clencher ring, a ring for the outer surface of the cushion and for the inner ends of the spokes, a band upon said ring, to strengthen the same, and securely hold the spokes in proper position and a dove-tail to hold suitable driving and reversing means, transmission disks secured to said hub and provided with ears, driving roller bearings mounted in and between said ears and between the spokes, driving boxes secured to said band by said dove-tail and bolted to the rim of the wheel to permit movement of said driving roller bearings a limited distance for driving or reversing.

My invention also consists in the details of construction and in the combination and arrangement of the several parts as herein set forth and claimed.

In the accompanying drawings, which serve to illustrate the construction, application and use of my invention: Figure 1 is a side elevation of a portion of a wheel embodying my invention, parts being broken away for the sake of clearness; Fig. 2 is an enlarged detail sectional view taken through a portion of the wheel; Fig. 3 is a view of the hub in end elevation and vertical section; Fig. 4 is a view of the jointed split ring for locking the clencher ring on the cushion; and Fig. 5 is a view partly in elevation and partly in section showing the driving box and means for connecting it to the outer rim and to the band on the inner ring.

Constructed as illustrated, 1 represents my improved pneumatic wheel for automobiles and 2 an axle upon which it is mounted, said axle being provided with roller bearings 3 as shown in Fig. 2, but if desired the hub 4 may be secured upon the axle in fixed relation thereto by means of a key 5, as shown in Fig. 3. The hub 4 is provided with a series of ears 6 extending radially therefrom, as clearly shown in Figs. 1, 2 and 3. Transmission plates 7 and 8 are mounted upon the hub adjacent said ears and are secured thereto by means of bolts 9 extending through said plates and said ears respectively and secured thereon by nuts 10. The hub 4 is formed polygonal in shape and the transmission plates 7 and 8 respectively are each provided with a central opening of similar shape to fit on said hub and prevent said disks from turning relatively to said hub. Mounted upon each of said bolts 9 is a roller bearing 11 and upon said bearings 11 between said transmission disks 7 and 8 I mount a clencher ring 12 upon which a pneumatic cushion 13 is secured. Said cushion comprises a flexible casing 14 containing an inner pneumatic tube 15 held by means of a clamping ring 16 secured in position by means of a split jointed lock ring 17, said jointed lock ring having a lug 18 to engage a suitable hole or recess in the clencher ring 12 to hold said jointed lock ring in clamping position. The outer tire 19 may be secured to the wood felly 20 in any suitable manner such as by means of a flanged clutch 21. Spokes 22 are secured to the felly in any suitable manner and extend inwardly and are secured to a ring 23, the periphery of which is formed of a metallic band 24 and the inner portion of which consists of a wood ring 25 preferably formed concave on its inner surface to receive and house the pneumatic cushion 13. The metallic band 24 is provided to hold the spokes in place and to hold the wood ring in shape. The metallic guards or disks 26 and 26' are screwed or otherwise secured upon the sides of ring 23 and project inwardly toward the hub between the flexible casing 14 and the transmission plates 7 and 8 respectively to prevent frictional engagement between said transmission plates and said casing. A suitable air valve stem 27 is provided for the purpose of inflating the cushion.

Driving boxes 28 are secured to the metallic frame 24 between the spokes 22 by means of dove-tails 29 engaging under-cut recesses 30 and are secured to the wood felly by means of bolts 31 and nuts 32. Driving bolts 33 secured to the transmission plates 7 and 8 respectively extend through the driving boxes 28 for the purpose of establishing a direct positive driving connection between the hub 4 and outer rim 20.

The driving bolts 33 are provided with shoulders 34 to engage the inner surface of the transmission plates 7 and 8 and hold said plates in fixed relation with each other to permit free movement of the outer portion of the wheels relatively to the hub. A sleeve 33' is mounted upon each bolt 33 to form roller bearings and I prefer to place a compressed paper covering upon said roller bearings to deaden the noise when the bearing comes into contact with the driving box.

The driving boxes 28 are arranged opposite each other and I preferably provide four driving boxes for each wheel. The transverse opening 35 through each box should be sufficiently large to allow for any compression in the pneumatic cushion in order that the full capacity of the pneumatic cushion may be utilized without interference of the driving bolts with the box under heavy jolts or sudden jars. It will be noted that I provide spaces 36 and 36' between the pneumatic cushion 13 and the transmission plates 7 and 8 respectively to allow the pneumatic cushion to expand therein.

In using the key 5 it is necessary to use the movable bearings over the hub and in the chain drive it is necessary to use the movable bearings both over the hub and axle.

When the hub is keyed to the axle, roller bearings over the axle are dispensed with and the roller bearings over the hub only are used, but if the roller bearings are used on the axle the roller bearings over the hub are also used.

The hub 3 is secured in place upon the axle 2 by means of the ordinary nut 37 for that purpose holding it against the collar 2' of the axle, and a combined grease and dust cap 38 is provided.

It will be seen that I provide a wheel in which the inner pneumatic cushion is thoroughly protected from injury and in which all the advantages as to flexibility found in an outer pneumatic tire are obtained. I also provide a device which is compact, strong, and neat and durable and which consists of a comparatively small number of parts. I also provide a device by which the outer transmission disk 7 may be readily removed, thus permitting easy access to the cushion for insertion or removal if the same should ever be necessary.

It will be noted that an advantage of my construction is that in case of removal of the transmission plate 7 for the purpose of repairing the cushion or other interior parts of the wheel, ears 6 hold bolts 9, roller bearings 11 and plunger ring 12 in position upon the hub thereby holding the entire wheel intact.

My invention is capable of some modification without material departure from its spirit or scope.

I claim:

1. In a pneumatic automobile wheel, a hub having radial ears thereon, transmission disks, bolts and nuts securing said transmission disks in place upon said hub, roller bearings upon said bolts between said radial ears, a rim, a ring between said hub and said rim and having its inner surface concaved, spokes connecting said rim and said ring, a pneumatic cushion mounted upon said roller bearings and engaging said concaved surface, guard disks secured to said ring and projecting between said transmission disks and pneumatic cushion to protect the latter, driving boxes secured to said ring and to said rim respectively and each having a transverse opening therethrough, shouldered driving bolts secured to and between said transmission disks and extending through the transverse opening in said driving box whereby free movement of the same is obtained therein, and roller bearings on said driving bolts, substantially as set forth and for the purposes specified.

2. In a pneumatic automobile wheel, a hub having fixed radial ears thereon, transmission disks, bolts and nuts securing said transmission disks in place upon said hub, roller bearings upon said bolts between said radial ears, a rim, a ring between said hub and said rim, spokes connecting said rim and said ring, a pneumatic cushion mounted upon said roller bearings and engaging said ring, driving boxes secured to said ring and said rim respectively and each having a transverse opening therethrough, shouldered driving bolts secured to and between said transmission disks and extending through the transverse opening in said driving box whereby free movement of the same is obtained therein, and roller bearings on said driving bolts, substantially as set forth and for the purposes specified.

3. In a pneumatic automobile wheel, a hub having integral radial ears thereon, transmission disks secured to said ears, movable bearings mounted upon said hub, a rim, a ring between said hub and said rim and having its inner surface concaved, spokes connecting said rim and said ring, a pneumatic cushion mounted upon said movable bearings, driving boxes dovetailed to said ring and bolted to said rim, said boxes each having a transverse opening therethrough and driving means connected to said transmission disks and extending through said openings respectively, substantially as set forth and for the purposes specified.

4. In a pneumatic automobile wheel, a hub, detachable transmission disks mounted upon said bolts, a metallic clencher ring upon said hub, bolts and nuts adapted to secure said disks thereon, roller bearings upon said bolts, a metallic clincher ring mounted upon said roller bearings, a pneumatic cushion mounted upon said roller bearings and engaging said ring, means for securing said cushion in place, a wood ring surrounding and engaging the periphery of said cushion, a metallic band surrounding and engaging said wood ring, spokes secured to said band and to said ring, a rim secured to said spokes, driving boxes secured to said rim and said ring respectively, and shouldered driving bolts extending through said driving boxes and secured to said transmission disks, substantially as set forth and for the purposes specified.

5. In a pneumatic automobile wheel, a hub having radial ears thereon, detachable transmission disks mounted upon said hub, bolts and nuts adapted to secure said disks thereon, roller bearings upon said bolts, a metallic clencher ring mounted upon said roller bearings, a pneumatic cushion comprising an inner flexible tube and an outer flexible casing, means for securing said cushion in place, a concave wood ring surrounding said cushion, a metallic band surrounding said ring, spokes secured to said band and to said ring, a rim secured to said spokes, driving boxes between said rim and said ring, bolts adapted to secure said boxes to said rim, a dove-tail adapted to secure said box to said band, and driving bolts extending through said driving boxes and secured to said transmission disks, for the purposes set forth.

OSCAR C. OLNEY.

Witnesses:
 EARL W. HERZOG,
 JOSEPH BRAUKMANN.

---

Copies of this patent may be obtained for five cents each, by addressing the "Commissioner of Patents, Washington, D. C."